United States Patent [19]
Galowin et al.

[11] 3,709,041
[45] Jan. 9, 1973

[54] FLUERIC ACCELEROMETER

[75] Inventors: Lawrence S. Galowin, Upper Saddle River; Michael J. De Santis, Lyndhurst; Cary Miller, Rockaway, all of N.J.

[73] Assignee: Singer-General Precision, Inc., Little Falls, N.J.

[22] Filed: May 4, 1970

[21] Appl. No.: 34,212

[52] U.S. Cl. .......................................... 73/515
[51] Int. Cl. .................................... G01p 15/02
[58] Field of Search ............. 73/515, 516; 138/42, 43

[56] References Cited

UNITED STATES PATENTS

| | | |
|---|---|---|
| 3,481,205 | 12/1969 | Schmidlin .......................... 73/515 |
| 2,327,195 | 8/1943 | Kosky et al. ....................... 138/43 |
| 3,541,865 | 11/1970 | Brown ................................ 73/515 |
| 3,221,562 | 12/1965 | Borcher et al. .................... 73/515 |
| 3,241,804 | 3/1966 | Bjorklund .......................... 138/43 |

*Primary Examiner*—Richard C. Queisser
*Assistant Examiner*—Herbert Goldstein
*Attorney*—S. A. Giarratana and Thomas W. Kennedy

[57] ABSTRACT

A flueric accelerometer wherein a a FLOW path for pressurized fluid is established through a porous housing, which flow is resisted by a deformable porous matrix comprised of solid material in proportion to acceleration. The housing is adapted to permit measurement of the resistance and therefore the acceleration.

6 Claims, 5 Drawing Figures

INVENTORS
LAWRENCE S. GALOWIN
MICHAEL J. DESANTIS &
CARY MILLER

BY S. A. Giamatana
ATTORNEY

INVENTORS
LAWRENCE S. GALOWIN
MICHAEL J. DESANTIS &
CARY MILLER

3,709,041

FLUERIC ACCELEROMETER

BACKGROUND OF THE INVENTION

The present invention relates to a flueric accelerometer, and more particularly to such an accelerometer in which a deformable material provided in a housing is adapted to resist the flow of fluid through the housing in proportion to the acceleration.

Many types of accelerometers are generally known. Some require mechanical moving parts such as a proof mass, or the like, which varies the opening in a fluidic device to generate a pressure signal. Also, beam displacement members have been proposed which do the same as above, or, alternately, change the gap in an electromagnetic field based upon displacement of a mass member. However, both of these proposals are subject to stiffness of the material, constraints, friction, temperature variations and extreme sensitivity to manufacturing tolerances.

In order to attempt to overcome these disadvantages, liquid mercury gas bubble accelerometers are known in which a liquid mercury is retained within a porous housing largely by means of surface tension film forces. The gas is passed through the mercury and the mercury resists the flow of the gas in proportion to acceleration. However, this arrangement is subject to contamination, freezing of the mercury with resultant solidification and loss of mercury through the pores of the cylinder housing under high accelerations. Furthermore, these mercury devices suffer from vaporization, from heating due to local environment conditions and from nuclear radiation.

SUMMARY OF THE INVENTION

It is therefore an object of the present invention to provide a flueric accelerometer which eliminates the need for relatively massive weight members and their associated disadvantages.

It is a further object of the present invention to provide a flueric accelerometer of the above type in which contamination, freezing, and loss of material is eliminated along with susceptibility to vaporization from heating and nuclear radiation.

Toward the fulfillment of these objects the accelerometer of the present invention comprises means to establish a flow path for fluid through a housing, and a deformable solid material disposed in the housing in the path of the fluid flow. The material is adapted to change the resistance to fluid flow in proportion to changes in acceleration and the housing including means to permit measurement of the resistance.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF PREFERRED EMBODIMENTS

Figure 1:
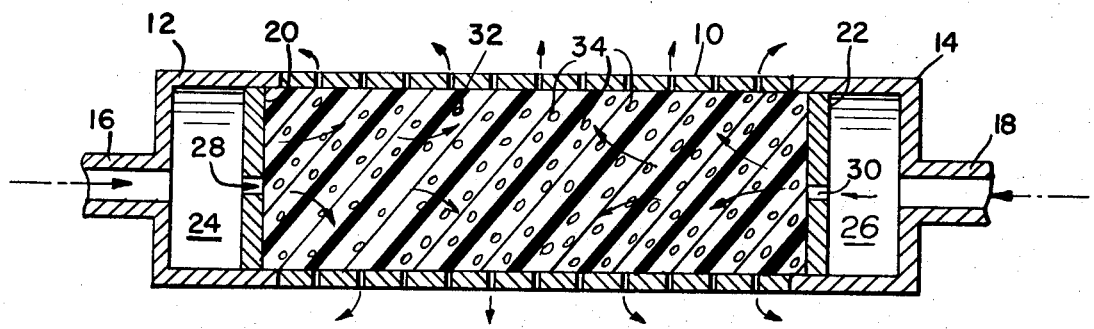
FIG. 1 is a vertical cross-sectional view of an accelerometer according to the present invention.

The accelerometer of FIG. 1 is in the form of a porous cylinder 10 sealingly engaged at each end by a pair of cylindrical cap members 12 and 14, which have fluid inlets 16 and 18, respectively.

A pair of rigid circular walls 20 and 22 are provided within the cap members 12 and 14 near the ends thereof to form a pair of pressure chambers 24 and 26, respectively, within the cap members. Each of the walls 20 and 22 have orifices 28 and 30, respectively, extending therethrough.

A deformable porous, solid material, shown in general by the reference numeral 32, is provided within the cylinder 10 between the confines of the walls 20 and 22 and is seeded with an assembly of hard, relatively heavy particles 34. The particles 34 are embedded within the material 32 so that movement of the particles relative to the material causes a resultant deformation of the material. As an example, the material 32 may be in the form of a synthetic sponge material and the particles 34 may be in the form of lead pellets or "shot."

In the operation of the accelerometer of FIG. 1, pressurized fluid, such as gas, is introduced into the chambers 24 and 26 via the inlets 16 and 18, and the fluid is metered by the orifices 28 and 30, respectively, as it passes into the cylinder and through the material 32, as indicated by the arrows. The fluid then passes radially outwardly from the device through the pores provided in the wall of the cylinder 10.

When the device experiences an acceleration, or a component thereof, aligned with the axis of symmetry of the device, i.e., in the direction from left to right, or visa versa, as viewed in FIG. 1, the inertial loading on the particles 34 causes them to move relative to the material 32 and thus deform it accordingly. This movement is in direct proportion to the acceleration and causes a corresponding variation in the resistance to the flow of the fluid across the cylinder. This, in turn, changes the pressure drop of the fluid between the chambers 24 and 26 and a differential pressure signal is thus available at the chambers which may be sensed by any known means, such as by a pair of manometers, a proportional fluid amplifier, etc., which signal is in proportion to acceleration.

Figure 2:
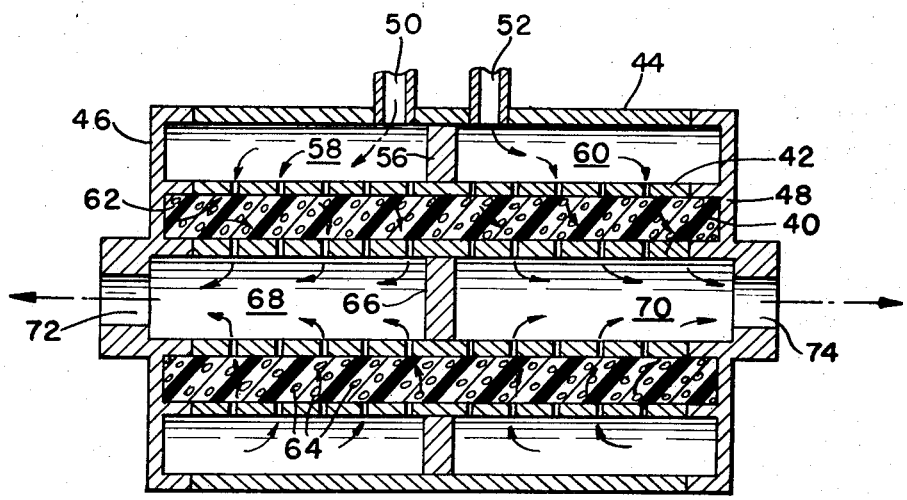
FIGS. 2 - 5 are views similar to FIG. 1, but showing alternative embodiments of the accelerometer of the present invention.

In the embodiment of FIG. 2, a pair of porous cylinders 40 and 42 are coaxially disposed with a space defined therebetween. A solid cylinder 44 extends over the cylinder 42 in a spaced relation thereto, and a pair of cap members 46 and 48 extend over the ends of the cylinders, as shown. The outer cylinder 44 has a pair of fluid inlets 50 and 52 and an annular disc 56 divides the space between the cylinders 42 and 44 into two chambers 58 and 60.

A deformable, porous, solid material 62 is provided in the space between the cylinders 40 and 42 and has a plurality of hard, relatively heavy particles 64 embedded therein. The material 62 and the particles 64 may be the same as described in connection with the embodiment of FIG. 1, above.

A disc 66 divides the space within the cylinder 40 into two chambers 68 and 70, which are vented by means of a pair of outlets 72 and 74 formed in the cap members 46 and 48, respectively.

In operation, pressurized fluid, such as gas, is passed into the chambers 58 and 60 through the inlets 50 and 52, respectively, whereby it passes through the porous wall of the cylinder 42 and into the material 62. It then passes through the porous wall of the cylinder 40 into the two chambers 68 and 70, from which it exits through the outlets 72 and 74, respectively.

In response to an acceleration, or a component thereof aligned with the axis of symmetry of the device, i.e., in a direction from left to right, or visa versa, as viewed in FIG. 2, a corresponding inertial loading is placed on the particles 64 causing resultant deformation of the material 62, thereby changing the resistance to flow of the fluid through the material, which resistance is in direct proportion to acceleration. A pressure differential thus occurs in the chambers 68 and 70, which can be sensed in any known manner such as by the means discussed in connection with the embodiment of FIG. 1.

Figure 3:
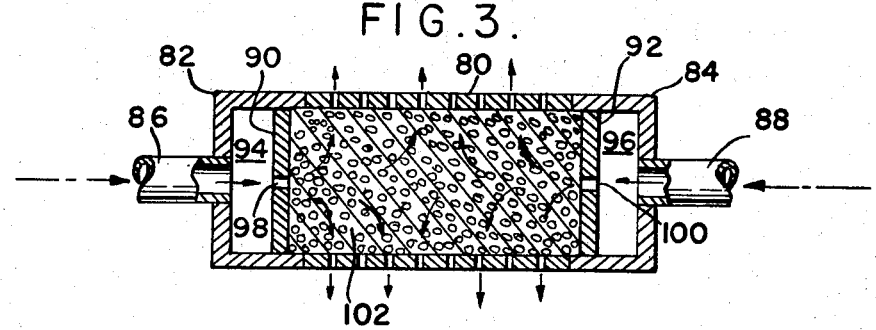
Figure 4:
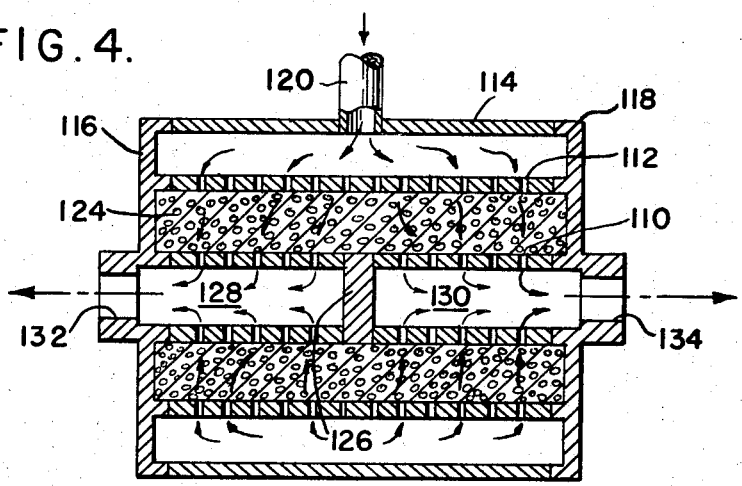

The accelerometers of FIGS. 3 and 4 are similar to the accelerometers of FIGS. 1 and 2, respectively, but utilize a different means of varying the resistance to fluid flow. In particular, the accelerometer of FIG. 3 consists of a porous cylinder 80 sealingly engaged at each end by a pair of cylindrical cap members 82 and 84, which have fluid inlets 86 and 88, respectively. A pair of rigid circular walls 90 and 92 are provided within the cap members 82 and 84 to form a pair of pressure chambers 94 and 96, respectively. Each of the walls 90 and 92 have orifices 98 and 100, respectively, extending therethrough.

A bed of solid particulate material, shown in general by the reference numeral 102 in FIG. 3, is provided within the cylinder 80 between the confines of the walls 90 and 92. The solid particulate material may be in the form of an assembly of capsules, each formed by a liquid droplet or solid pellet encapsulated within a pliable material. As an example, the pliable material may be in the form of a flexible transparent packaging film such as a polyvinyl chloride, while the encapsulated material may be in the form of liquid mercury.

In operation of the accelerometer of FIG. 3, pressurized fluid, such as gas, passes from the inlets 86 and 88 into the chambers 94 and 96, whereby the fluid is metered by the orifices 98 and 100, respectively, as it passes into the cylinder 80 and through the bed 102. The fluid fluidizes the capsules in a known manner, and then passes radially outwardly from the device through the pores provided in the wall of the cylinder 80, as shown by the arrows.

When the accelerometer of FIG. 3 experiences an acceleration, or a component thereof, aligned with the axis of symmetry of the device, i.e., in the direction from left to right, or visa versa, as viewed in FIG. 1, each capsule in the bed 102 is deformed in proportion to the resultant loading due to movement of the relatively heavy encapsulated material. This causes a resultant "packing" of the fluidized bed in direct proportion to the acceleration and causes a variation in the resistance to the flow of fluid across the cylinder 80 which also is in proportion to the acceleration. This, in turn, changes the pressure drop of the fluid between the chambers 94 and 96, and a differential pressure signal is thus available at the chambers which may be sensed to provide an output in proportion to acceleration.

In the embodiment of FIG. 4, a pair of porous cylinders 110 and 112 are coaxially disposed with a space defined therebetween. A solid cylinder 114 extends over the cylinder 112 in a spaced relation thereto, and a pair of cap members 116 and 118 close the ends of the cylinders, as shown.

The outer cylinder 114 has a fluid inlet 120, and a bed 124 of solid particulate material, such as the capsules described in connection with the embodiment of FIG. 3, is provided in the space between the cylinders 110 and 112.

A disc 126 divides the space within the cylinder 110 into two chambers 128 and 130, which are vented by means of a pair of outlets 132 and 134 formed in the cap members 116 and 118, respectively.

In operation, pressurized fluid, such as gas, is passed into the chamber between the cylinders 112 and 114, via the inlet 120, whereby it passes through the porous wall of the cylinder 112 and into the bed 124 to fluidize the capsules contained therein. The fluid then passes through the porous wall of the cylinder 110 and into the chambers 128 and 130, from which it exits through the outlets 132 and 134, respectively, as indicated by the arrows.

In response to an acceleration, or a component thereof aligned with the axis of symmetry of the device, i.e., in a direction from left to right, or visa versa, as viewed in FIG. 4, the capsules deform in the manner described above, thereby changing the resistance to flow of the fluid through the bed 124, which resistance is in direct proportion to acceleration. A pressure differential thus occurs in the chambers 128 and 130 which can be sensed in any known manner such as by the means discussed in connection with the embodiment of FIG. 1.

Figure 5:
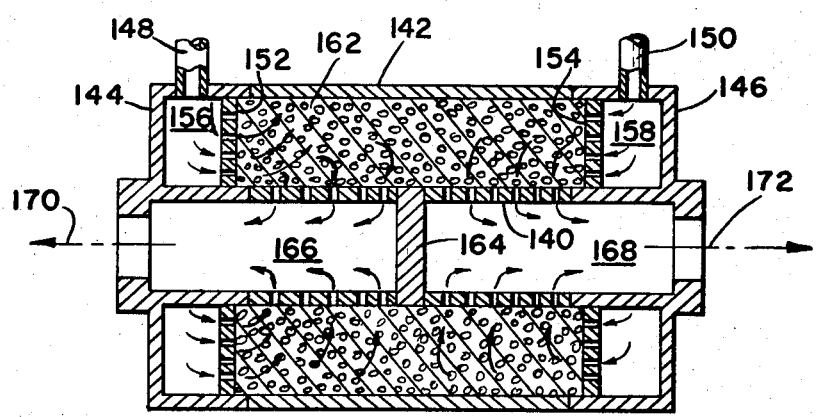

In the embodiment of FIG. 5, a porous cylinder 140 is enclosed by a solid cylinder 142 with a space defined therebetween. A pair of cap members 144 and 146 extend over the ends of the cylinders 140 and 142, with the cap members having fluid inlets 148 and 150, respectively. A pair of porous annular walls 152 and 154 are provided within the cap members 144 and 146 to form chambers 156 and 158, respectively.

As in the two previous embodiments, a bed 162 of deformable particulate material, such as the capsules discussed in the two previous embodiments, is provided in the space between the cylinders 140 and 142.

A disc 164 divides the space within the cylinder 140 into two chambers 166 and 168 and the cap members 144 and 146 have outlets 170 and 172, respectively, formed therein which communicate with the chambers.

In operation, pressurized fluid, such as gas, is passed through the inlets 148 and 150 whereby it passes through the porous walls 152 and 154 and into the bed 162. After passing through a portion of the bed, the fluid then passes through the porous wall of the cylinder 140 and into the chambers 166 and 168 before exiting from the outlets 170 and 172, respectively, as shown by the arrows. The fluid fluidizes the capsules, and any acceleration, or components thereof, aligned with the axis of symmetry of the device will cause each capsule to deform in response to acceleration. This causes a resultant packing of the bed 162 and a corresponding change in resistance to the flow of gas therethrough. The pressure in the chambers 166 and 168 will change accordingly, thus permitting the pressure differential to be sensed by any known means to give an output in direct proportion to the acceleration.

The above embodiments thus provide an effective means for detecting acceleration while eliminating relatively massive weight members normally associated with known proof mass devices. Also, the use of solid materials eliminates the problem of a liquid flueric accelerometer and its resultant leakage, vaporization, freezing, etc. Further, the accelerometer of the present invention is simple to fabricate especially since the need for a critical ullage volume is eliminated.

Although the above embodiments have been described in connection with pressure differential in the various chambers, it is understood that the mass flow to or from the various chambers will also vary in proportion to acceleration and can be sensed to provide the output signal.

Of course, other variations of the specific construction and arrangement of the accelerometer disclosed above can be made by those skilled in the art without departing from the invention as defined in the appended claims.

We claim:

1. An accelerometer comprising a housing, means including an inlet and an outlet to establish a flow path for fluid through said housing, and a bed of material disposed in said housing in the path of the fluid flow, said bed of material adapted to change the resistance to fluid flow in proportion to changes in acceleration of said housing, said housing including means to permit measurement of said resistance, wherein said bed of material includes a plurality of solid particles forming a proof mass, said plurality of particles being selectively arranged in a spaced relationship forming therebetween a plurality of variable-volume passageways for fluid flow through the bed of material, and wherein said bed of material includes particle support means adapted to resiliently support said particles in said spaced relationship within said housing for movement of said particles relative to said housing due to an acceleration force and for simultaneous variation of the resistance to fluid flow through said passageways for sensing the amount of the acceleration force.

2. The accelerometer of claim 1 wherein said particle support means is in the form of a sponge material and said plurality of particles is a plurality of solid pellets embedded therein.

3. The accelerometer of claim 1 wherein each said particle is a capsule which is in the form of a thin film of pliable material encapsulating a relatively heavy liquid material.

4. The accelerometer of claim 1 wherein said particle support means includes gas flow means, said gas flow means being adapted to fluidize said plurality of particles.

5. The accelerometer of claim 1 wherein said housing includes a porous cylinder, and an additional cylinder extending over said porous cylinder and defining a chamber therewith, said bed of material being disposed in said chamber.

6. The accelerometer of claim 5 wherein at least one additional chamber for said fluid flow is provided to permit said measurement of said resistance.

* * * * *